Oct. 18, 1955  T. P. PAJAK  2,720,949
CONSTRUCTION FOR AIRFOILS OR THE LIKE
Filed May 1, 1950  3 Sheets-Sheet 1

INVENTOR
THEODORE P. PAJAK,
BY *Martin E. Hogan Jr.*
ATTORNEY

Oct. 18, 1955 T. P. PAJAK 2,720,949
CONSTRUCTION FOR AIRFOILS OR THE LIKE
Filed May 1, 1950 3 Sheets-Sheet 2

INVENTOR
THEODORE P. PAJAK,
BY *Martin E. Hogan Jr*
ATTORNEY

United States Patent Office 2,720,949
Patented Oct. 18, 1955

2,720,949

CONSTRUCTION FOR AIRFOILS OR THE LIKE

Theodore P. Pajak, Baltimore, Md., assignor to The Glenn L. Martin Company, Middle River, Md., a corporation of Maryland Application May 1, 1950, Serial No. 159,361

2 Claims. (Cl. 189—34)

This invention relates to aircraft and more particularly to a wing of the type employing low density cellular core interposed between outer skins in a sandwich construction.

The ordinary low density cellular core comonly used in structural members such as airfoils and other type panels, has a nearly constant strength and density over the entire plan form area, for a given thickness and type of material. Many applications of this type of structure require greater strength in certain portions than in other portions, and to accomplish this, solid materials such as wood, having the necessary strength are substituted for the cellular core in those portions wherein greater strength is required. These inserts cause stress concentrations due to the discontinuity between the cellular core and the high strength insert. This fact is realized to be one of great concern when it is known that the principal duty of the core in a sandwich type of construction is to transmit internal bending moments developed by the applied loads to the outer skins, because the core is then subjected to relatively high shear stresses. These high shear stresses will concentrate at any discontinuity of the core, overstress the structure in those areas, and cause a failure.

It would, of course, be possible to design a cellular core of conventional construction having sufficient strength to withstand maximum forces expected to be applied, but then certain portions of the core would be "understressed," producing a structure which is inefficient, as determined by a comparison between the actual core strength and the required core strength. This is a very important consideration in the aircraft field and in the light of overcoming this disadvantage, a low density cellular core construction has been invented which will permit strength variations within the core without resorting to high strength inserts which result in discontinuities.

It is an object of this invention to provide a low density cellular core construction having certain portions greater in strength than the strength in other portions.

Another object of this invention is to provide a structure for airfoils and the like which may be designed for strength variations throughout the panel without the use of discontinuous inserts.

Another object of this invention is to provide a core construction comprising a plurality of strips of material, bonded together at spaced intervals to form a cellular structure.

Further and other objects will become apparent from the accompanying description and drawings which form a part of this disclosure and in which like numerals refer to like parts.

Figure 1:
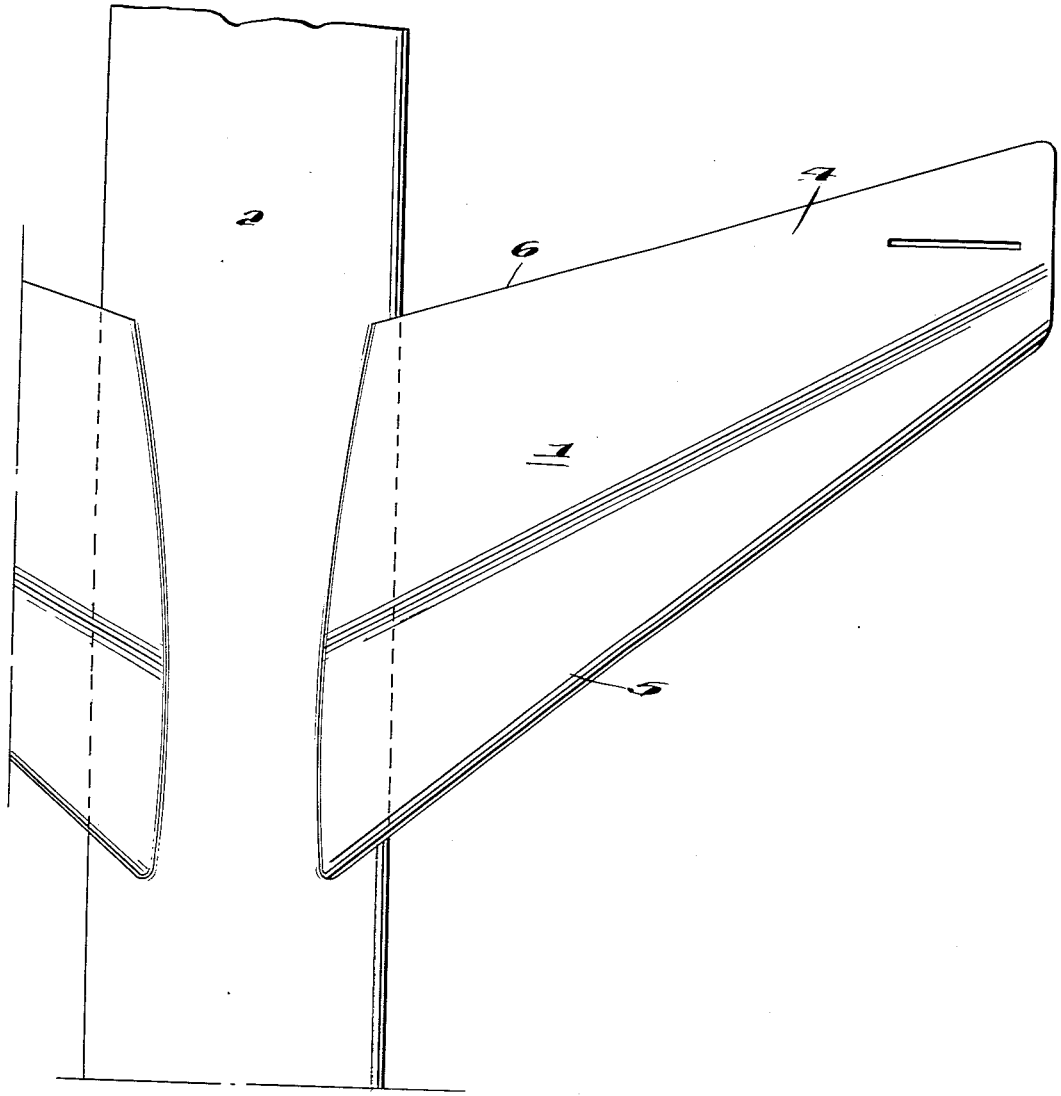
Figure 1 is a view of a portion of an aircraft showing a thin wing airfoil in plan form mounted to the fuselage.
Figure 2:
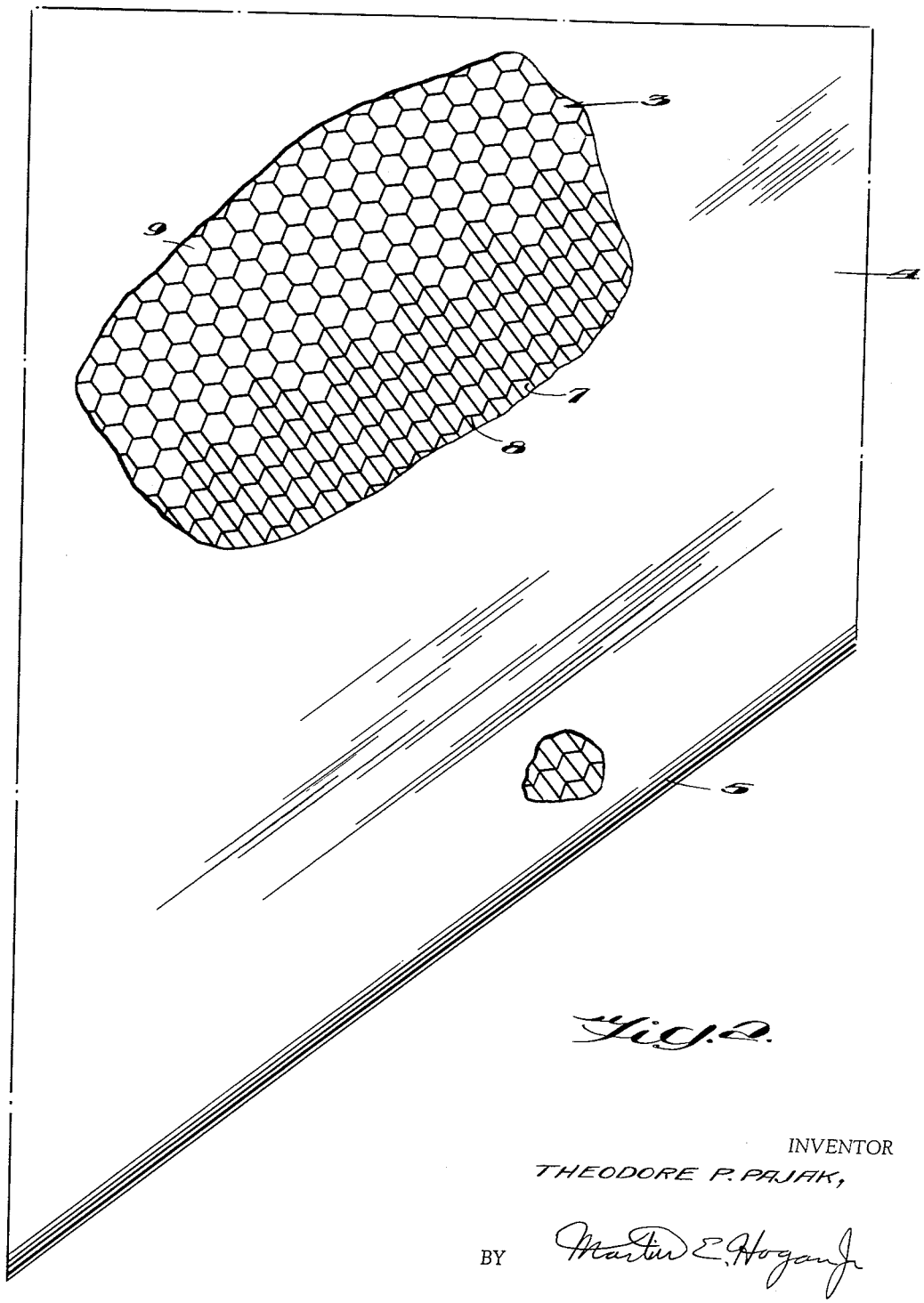
Figure 2 is an enlarged view of a portion of the leading edge of the airfoil shown in Figure 1 having areas of skin cut away to show the cellular core construction.
Figure 3:
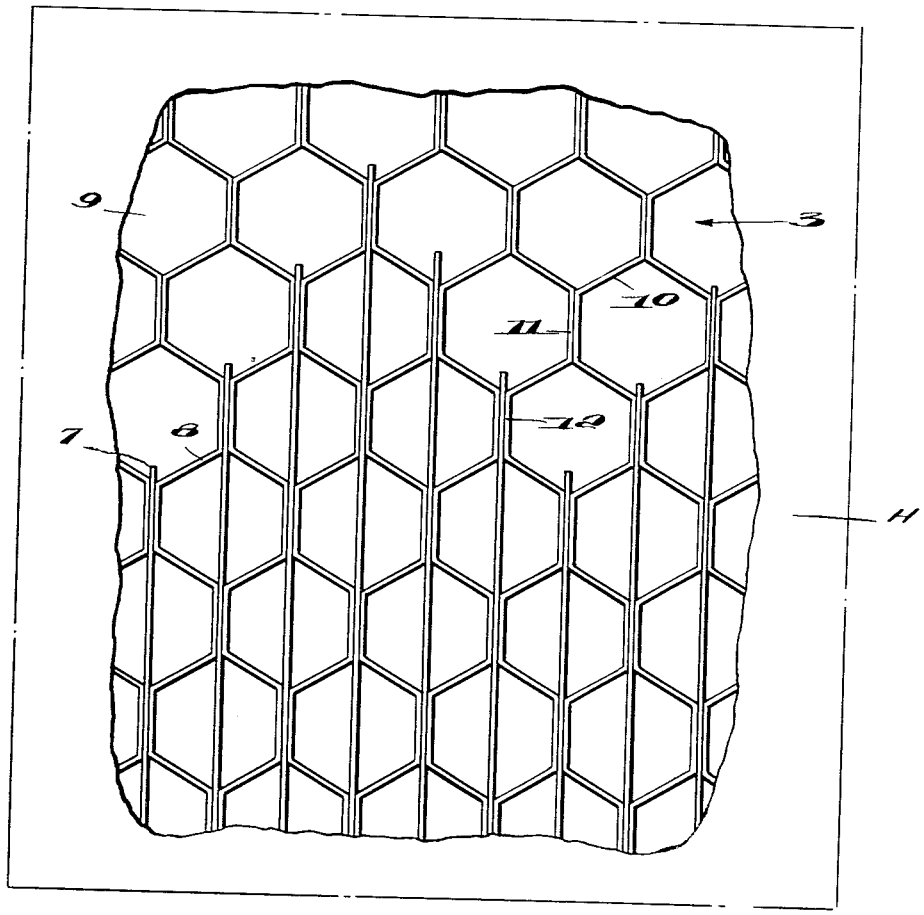
Figure 3 is a still further enlarged fragmentary view showing the detailed construction features of the core in the transition area between the high strength and low strength portions shown in Figure 2.

The high speed airfoil 1 mounted on fuselage 2 as shown in Figure 1 embodies the wing construction of this invention. The cellular core material 3 as shown in Figures 2 and 3, is shaped to conform to the final desired contour and then covered with metal skin 4 and securely bonded thereto with a thermosetting adhesive or other suitable bonding agent. Leading edge 5 of airfoil 1 represents a portion subjected to greater stress than is the wing portion adjacent the trailing edge 6. To strengthen core 3 so that it can withstand the high forces to which it will be subjected, a plurality of generally straight divider strips of metal 7 are interposed between the corrugated strips of metal 8, adjacent the leading edge of airfoil 1. Divider strips 7 extend from the core at the leading edge 5 rearward toward trailing edge 6, sufficiently far as to enable that portion of the core to withstand the greater loads to be applied. To prevent the development of a shear plane between the high strength portions and the low strength portions of core 3, divider strips 7 terminate within the core in staggered relationship as shown in Figures 2 and 3.

Core material 3 is constructed, in accordance with predetermined design requirements. The plurality of corrugated strips 8 of very thin metal foil, usually .002 to .006 of an inch in thickness, are placed face-to-face adjacent one another in such a manner as to form a plurality of generally hexagonal cells 9. During this operation, generally straight divider strips 7, also of very thin metal foil and being of shorter length than the length of corrugated strips 8, are interposed between the adjacent pairs of corrugated strips 8 in those portions wherein the greater strength is required. The width of divider strips 7 is substantially equal to the width of the adjacent corrugated strips 8. The formation of generally hexagonal cells 9 in the greater strength portion is broken up by the divider strips 7, doubling the number of cells per unit area in that portion. A thermosetting adhesive or other suitable bonding agent is applied to the adjoining surfaces of said strips immediately prior to their being arranged face-to-face as described above. Then the thermosetting adhesive in the core assembly is cured by the application of heat and pressure, thereby effecting a bond at spaced intervals where portions of the strips are contiguous, so as to produce a unitary structure.

Each of cells 9 in core 3 has its axis generally parallel to the axes of all the other cells in the core. These cell axes may be further identified as being generally perpendicular to the plane of the core. It is also noted that, as shown in Figure 3, core 3 has cell walls with single thickness 10, cell walls with double thickness 11 and cell walls with triple thickness 12, wherein the cell walls of double and triple thicknesses are generally parallel to one another, and wherein the median plane of each of the strips forming the cell walls of the core remain generally straight and parallel to one another.

The strength of core 3 in the greater strength portions may be controlled by the thickness of the foil used in the generally straight divider strips 7. The thickness of corrugated strips 8 will control the strength of the low strength portions. By making a proper selection of thicknesses for strips 7 and strips 8, core 3 may be constructed so as to withstand the most complex type loading without resorting to the use of discontinuous high strength inserts or other design considerations which result in inefficiency.

The same construction features incorporated in airfoil 1 may apply equally well to other type panels and to the use of other materials, depending upon the particular application.

It is to be understood that certain changes, alterations, modifications and substitutions can be made without departing from the spirit and scope of the appended claims.

I claim as my invention:

1. A panel construction comprising a low-density cellular core having an outer skin bonded thereto, said core comprising a plurality of alternately arranged corrugated strips of material and reinforcing strips of material placed face-to-face against one another forming a plurality of open-ended cells, said reinforcing strips being of shorter length than the corrugated strips, each said strip being bonded to its adjacent strips at spaced intervals forming a unitary structure, each cell having its axis generally parallel to the axes of all other cells in the core and generally perpendicular to the plane of said skin, said core having cell walls of single thickness, cell walls of double thickness and cell walls of triple thickness formed by said strips, said double thickness and triple thickness walls being generally parallel to one another, and said reinforcing strips terminating within said core in staggered relationship to each other to prevent stress concentrations due to the development of shear planes.

2. A low-density sandwich panel having a cellular core construction with portions thereof of greater strength than other portions, comprising a plurality of alternately arranged corrugated strips of metal and generally straight reinforcing strips of metal placed face-to-face against one another forming a plurality of open-end cells, said reinforcing strips being of a shorter length than said corrugated strips, each said strip being bonded to its adjacent strips at spaced intervals forming a unitary structure, said cells having their axes generally parallel to one another and generally perpendicular to the plane of the surface of said panel, said reinforcing strips terminating within said core in staggered relationship to prevent stress concentrations due to the development of shear planes, said core having cell walls of single thickness, cell walls of double thickness and cell walls of triple thickness formed by said strips, said double thickness and triple thickness walls being generally parallel to one another.

References Cited in the file of this patent

UNITED STATES PATENTS

| | | |
|---|---|---|
| 1,076,527 | Streichert | Oct. 21, 1913 |
| 1,660,576 | Owston | Feb. 28, 1928 |
| 1,855,161 | Wyman | Apr. 19, 1932 |
| 2,122,479 | London | July 5, 1938 |
| 2,477,852 | Bacon | Aug. 2, 1949 |

FOREIGN PATENTS

| | | |
|---|---|---|
| 762,218 | France | Apr. 7, 1934 |
| 628,814 | Germany | Apr. 16, 1936 |